(12) United States Patent
Lepczyk et al.

(10) Patent No.: US 10,214,103 B2
(45) Date of Patent: Feb. 26, 2019

(54) METHOD FOR CAREFUL OPERATION OF AN ACTUATOR FOR A FORCE CONTROLLER OF AN ACCELERATOR PEDAL

(71) Applicant: AUDI AG, Ingolstadt (DE)

(72) Inventors: Daniel Lepczyk, Schrobenhausen (DE); Maximilian Dietrich, München (DE); Daria Makhortova, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/741,650

(22) PCT Filed: Jul. 7, 2016

(86) PCT No.: PCT/EP2016/001169
§ 371 (c)(1),
(2) Date: Jan. 3, 2018

(87) PCT Pub. No.: WO2017/020985
PCT Pub. Date: Feb. 9, 2017

(65) Prior Publication Data
US 2018/0201130 A1     Jul. 19, 2018

(30) Foreign Application Priority Data

Aug. 1, 2015  (DE) .................... 10 2015 010 034

(51) Int. Cl.
*B60K 26/02* (2006.01)
*B60W 50/16* (2012.01)
(Continued)

(52) U.S. Cl.
CPC .......... *B60K 26/021* (2013.01); *B60W 50/16* (2013.01); *G05G 1/44* (2013.01); *G05G 5/03* (2013.01);
(Continued)

(58) Field of Classification Search
CPC ...... B60K 26/021; B60K 2026/022–2026/023; B60W 50/16; Y02T 10/84; G05G 5/03
See application file for complete search history.

(56) References Cited

U.S. PATENT DOCUMENTS

2006/0109098 A1* 5/2006 Grill ................. B60Q 9/00
340/439
2008/0042489 A1* 2/2008 Lewis ................ B60K 6/48
303/152
(Continued)

FOREIGN PATENT DOCUMENTS

CN      103974846 A    8/2014
CN      104169120 A    11/2014
(Continued)

OTHER PUBLICATIONS

Notification of Transmittal of Translation of the International Preliminary Report on Patentability dated Feb. 15, 2018, in connection with corresponding international Application No. PCT/EP2016/001169 (6 pgs.).
(Continued)

*Primary Examiner* — Orlando Bousono
(74) *Attorney, Agent, or Firm* — Maier & Maier, PLLC

(57) ABSTRACT

A method for the operation of at least one actuator for a force controller of a device, for which a user of the device is provided with a haptic feedback message about at least one operating state of the device by a force, which is predetermined in its strength and acts by way of at least one actuator on the force controller, when the force controller is brought by the user to at least one predetermined point on a track of movement of the force controller. The at least one actuator is controlled in such a way that the strength of the force acting by way of the at least one actuator on the force controller is reduced after another predetermined period of time.

9 Claims, 2 Drawing Sheets

(51) Int. Cl.
*G05G 1/44* (2008.04)
*G05G 5/03* (2008.04)
*G05G 1/30* (2008.04)

(52) U.S. Cl.
CPC .. *B60K 2026/022* (2013.01); *B60K 2026/023* (2013.01); *G05G 1/30* (2013.01); *G05G 2505/00* (2013.01)

(56) References Cited

U.S. PATENT DOCUMENTS

| | | | | |
|---|---|---|---|---|
| 2008/0283024 | A1* | 11/2008 | Gregorio | F02D 11/105 123/399 |
| 2012/0158252 | A1* | 6/2012 | Bonarens | B60N 3/06 701/49 |
| 2013/0186229 | A1* | 7/2013 | Drews | B60K 26/021 74/513 |
| 2014/0330499 | A1* | 11/2014 | Sieber | B60K 26/021 701/70 |
| 2015/0127234 | A1* | 5/2015 | Wagner | B60K 26/021 701/70 |
| 2015/0127236 | A1* | 5/2015 | Sieber | B60W 50/16 701/70 |
| 2015/0143944 | A1* | 5/2015 | Zell | G05G 1/44 74/514 |

FOREIGN PATENT DOCUMENTS

| | | |
|---|---|---|
| CN | 104736371 A | 6/2015 |
| DE | 10217050 A1 | 4/2003 |
| DE | 102004026407 A1 | 12/2005 |
| DE | 102004026409 A1 | 12/2005 |
| DE | 102007011739 A1 | 9/2008 |
| DE | 102010018753 A1 | 11/2011 |
| DE | 10 2012 217 677 A1 | 3/2014 |
| DE | 102012108589 A1 | 3/2014 |
| DE | 102013010269 A1 | 12/2014 |
| WO | 2014048659 A1 | 4/2014 |

OTHER PUBLICATIONS

German Search Report dated Apr. 5, 2016 of corresponding German application No. 102015010034.3; 5 pgs.
International Search Report dated Sep. 8, 2016 in corresponding Application No. PCT/EP2016/001169; 12 pgs.
Chinese Office Action dated Sep. 12, 2018, in connection with corresponding CN Application No. 201680045075.9 (6 pgs., English translation not available).

* cited by examiner

METHOD FOR CAREFUL OPERATION OF AN ACTUATOR FOR A FORCE CONTROLLER OF AN ACCELERATOR PEDAL

FIELD

The present invention relates to a method for the operation of at least one actuator for a force controller of a device and a corresponding device.

BACKGROUND

During operation of a device, such as, for example, of a vehicle with different operating states, it can transpire that a feedback message is to be provided to the user at a force controller, such as, for example, at an accelerator pedal of the vehicle. For providing such a feedback message, actuators are generally used, which act with a force in a predetermined strength on the force controller and, for example, counteract a force that is applied by a user for deflecting the force controller. Accordingly, strong forces are required, which, in turn, lead to a high load being placed on a respective actuator, so that it may happen that, for component protection reasons, for example, for protection against overheating, the actuator has to be switched off.

In the German publication DE 10 2012 108589 A1, a method for operating a motor vehicle that has at least one drive unit, which is designed as an internal combustion engine, is presented, wherein the drive unit is actuated via a gas pedal and a control unit that interacts with the gas pedal, whereby a driver is alerted by way of a haptic feedback message at the gas pedal that, in response to the gas pedal having traversed a path of travel, which is associated with a specific power requirement transmitted to the control unit, a defined action that brings about a change in the travel drive is initiated and carried out, wherein the haptic feedback message is implemented as a characteristic of the gas pedal that is stored in the control unit and starts from the defined free path of travel of the specific path of travel of the gas pedal.

The German publication DE 10 2013 010269 A1 relates to a method for providing a haptic feedback message for activation of a downshift operation in an automatic transmission.

A gas pedal with a kickdown switch is disclosed in the German publication DE 10 217 050 A1.

SUMMARY OF THE DISCLOSURE

Against this background, a method for the operation of at least one actuator for a force controller of a device is presented, for which a user of the device is provided with a haptic feedback message about at least one operating state of the device by means of a force that is predetermined in its strength and acts by way of the at least one actuator on the force controller, when the force controller is brought by the user to at least one predetermined point on a track of movement of the force controller, and wherein the at least one actuator is controlled in such a way that, once the user has deflected the force controller for a predetermined period of time at the at least one predetermined point on the track of movement of the force controller and/or has held it at this point, the strength of the force that acts by way of the at least one actuator on the force controller is reduced after a further predetermined period of time.

The formulation "deflects . . . at the at least one predetermined point on the track of movement of the force controller and/or holds it at this point" is also understood to mean a movement or a holding in a region that is directly adjacent to the point. This directly adjacent region is defined by a curve of the force that acts by way of the actuator on the force controller.

The presented method serves, in particular, for secure and careful operation of an actuator for providing a haptic feedback message to a force controller of a device, such as, for example, a hybrid vehicle.

In order to alert a user of a hybrid vehicle about a specific operating state, such as, for example, an engagement of an internal combustion engine to an electric drive, it is provided that the user is provided via an actuator with a haptic feedback message, for example, in the form of a pressure point, that is, a force that counteracts the force applied by a user on the force controller. Because such a feedback message requires strong forces, which place a correspondingly strong demand on the actuator and heat the actuator, it is provided in accordance with the invention that the strength of the force that is produced by the actuator and acts on the force controller is reduced after a predetermined period of time in the case that the force controller is brought by the user to at least one predetermined point on a track of movement of the force controller or the force controller is held by the user in a predetermined region on the track of movement of the force controller.

A force controller is to be understood in the context of the present invention to mean any technical device for adjusting a force at a device, in particular, at a pedal.

It has been found that a particular user does not constantly require a haptic feedback message for detecting and holding a point on the track of movement of a particular force controller. Accordingly, it is sufficient to provide the haptic feedback message solely for orientation of the user on the track of movement and, once the user has found a respective desired position on the track of movement, that is, a position that is characteristic of a particular desired operating state, the actuator used for providing the haptic feedback message is to be deactivated or the force that is to be produced by the actuator, in particular a sustained force, is to be reduced. Through reduction of the force produced by the actuator, any heating of the actuator is stopped and any emergency switch-off for component protection reasons, for example, is prevented.

In a possible embodiment of the presented method, it is provided, for the case that the strength of the force acting by way of the at least one actuator on the force controller is reduced, that the predetermined point for the feedback message is shifted on the track of movement of the force controller in the direction of deflection, so that, during a shift of the force controller onto the predetermined point shifted in the direction of deflection, the user is provided once again with a feedback message, by means of the at least one actuator and a force in the predetermined strength and, in the further course, said feedback is reduced if need be.

In order to reduce a force provided by a respective actuator and thereby to protect the actuator, it can be provided that a predetermined point on the track of movement of a force controller, at which the actuator is to provide the force, is shifted slightly in the direction of deflection, that is, for example, by a few percent of the distance of the track of movement, once a particular user has held the force controller in a predetermined region or at the predetermined point for a predetermined period of time. Through the shift of the predetermined point in the direction of deflection, a command for activation of the actuator is shifted along with the predetermined point. This means that the actuator is activated initially at the predetermined point in order to provide a feedback message to the user, so that the user detects the predetermined point. In further operation of a corresponding device, the actuator is deactivated, because the position for activation of the actuator shifts in accordance with the predetermined point, for example, relative to a current position of the force controller.

If the predetermined point at which the haptic feedback message is provided by way of the actuator is shifted in the direction of deflection of a pedal, that is, of a force controller, then, on the one hand, the actuator is deactivated or a force to be applied by the actuator is reduced, as a result of which the actuator is protected. On the other hand, in a displacement or pivoting of the force controller out of the predetermined region or beyond a correspondingly shifted or changed predetermined point, the user is provided once again with a feedback message by way of the actuator. Accordingly, the user is provided with a possibility of detecting a point that is characteristic of a particular operating state for a particular force controller on a track of movement of a force controller, and the actuator for providing a haptic feedback message to the force controller is subjected to only minor or temporary load.

In another possible embodiment of the presented method, it is provided that the period of time during which the user is to bring the force controller to the at least one predetermined point of the track of movement of the force controller and/or the additional period of time after which the strength of the force acting on the force controller is reduced and/or a distance by which the predetermined point is shifted on the track of movement of the force controller in the direction of deflection are or is chosen dynamically depending on an operating parameter.

In particular, it is provided that the shift of the predetermined point or region and/or the deactivation of the actuator occurs as a function of freely parameterized values of the period of time during which the user has to bring the force controller to the at least one predetermined point of the track of movement of the force controller, or of the additional period of time after which the strength of the force acting on the force controller is reduced, or the distance by which the predetermined point is shifted on the track of movement of the force controller in the direction of deflection. This means that the aforementioned values can be predetermined at will or dynamically adjusted to, for example, an operating state of a particular device, and, for example, the user can be provided with a feedback message that is adapted to a current operating state or a current operating behavior. Thus, for example, it can be provided that the actuator is activated or deactivated depending on a displacement pattern, that is, a pivot pattern, of the force controller.

In another possible embodiment of the presented method, it is provided that the strength of the force acting by way of the at least one actuator on the force controller is reduced in accordance with a predetermined curve gradient.

In order to make it possible for the user to hold a position detected by way of a haptic feedback message on a track of movement of a force controller, it is provided that the strength of a force that is to be applied by way of a particular actuator for the haptic feedback message is reduced gradually, that is, in accordance with a predetermined gradient. Through a gradual reduction of the haptic feedback message or of the force determining the haptic feedback message, the user is brought slowly to a state without the haptic feedback message, so that the haptic feedback message or the corresponding actuator can be deactivated unnoticeably, if need be, by the user.

The presented method is further suited for the planning of devices for which only specific actuators with small dimensions, for example, are to be installed. On account of the careful operation in accordance with the presented method, it is also possible to use relatively small actuators for providing a respectively required force. Furthermore, the presented method makes possible an arrangement of actuators in thermally critical installation situations as well as a cost-effective design of corresponding devices.

In another possible embodiment of the presented method, it is provided that a respective curve gradient is chosen for reduction of the force provided by the at least one actuator depending on the force applied by the user on the force controller.

For fine-tuning to a respective user, that is, in order to provide the user with a personalized haptic feedback message, the deactivation of which in accordance with the presented method remains as unnoticeable by the user as possible, a curve gradient can be adjusted for reduction of the force provided by a particular actuator to a force provided by the user, that is, a force applied by the user at a respective force controller. This means that, for example, when the course of the force changes abruptly, the force applied by the user on the force controller, which is likewise provided abruptly by way of the actuator, that is, is provided in a rapidly rising manner and is afterwards likewise rapidly diminished, whereas, in contrast, in the case of a constant buildup in force by the user, the reduction of the force applied by way of the actuator correspondingly occurs slowly and continuously.

In another possible embodiment of the presented method, it is provided that a control unit of the device reduces an electric current used for the operation of the at least one actuator in order to reduce the strength of the force acting by way of the at least one actuator on the force controller.

Control units, such as, for example, a motor or central control unit of a vehicle, are suitable for the control of electrical currents that are supplied to the respective actuators. Accordingly, it is provided that a control unit is configured in such a way that an electrical current is supplied to an actuator that determines a course or curve of force in accordance with the presented method.

In another possible embodiment of the presented method, it is provided that the strength of the force acting by way of the at least one actuator on the force controller is reduced after another predetermined period of time, when the force controller is held by the user at a point on the track of movement of the force controller, said point lying before the point at which user is provided with the haptic feedback message at the force controller.

Obviously, the presented method is also suitable for the operation of an actuator in the case that a particular user holds a force controller just before a respective predetermined point at which a feedback message is to be provided, so that the user is provided with a haptic feedback message solely when a current fixed position of the force controller is passed, and a sustained load of the actuator is prevented. Loads of the actuator due to, for example, a stand-by operation are thereby prevented.

In another possible embodiment of the presented method, it is provided that the reduction in the strength of the force acting by way of the at least one actuator on the force controller occurs as a function of a movement profile of the force controller.

Furthermore, it is conceivable that the reduction of the force provided by a respective actuator is adjusted dynamically in certain situations. In particular, in the case of unsteady movement profiles for which a driver avoids constant settings of a particular force controller, such as, for example, during travel in city traffic, it can be provided that the reduction of the force provided by way of the actuator does not occur or occurs only in reduced scope, so that, for example, the haptic feedback message is manifested less strongly.

In another possible embodiment of the presented method, it is provided that the reduction in the strength of the force acting by way of the at least one actuator on the force controller occurs depending on at least one external condition taken from the following list of external conditions: ambient temperature of the at least one actuator, air humidity in the surroundings of the at least one actuator, and state of charge of an energy storage unit supplying the at least one actuator with electric power.

In order to prevent any overheating or temperature-induced emergency switch-off of a respective actuator, it can be advantageous when, in a calculation for establishing respective parameters for the reduction of a force to be produced by a respective actuator, such as, for example, in a calculation of a period of time or a distance for shifting of a predetermined point, external conditions, that is, for example, ambient conditions such as an ambient temperature, are included. Accordingly, it is conceivable that a force to be produced by a respective actuator is reduced earlier at high ambient temperatures and later at low ambient temperatures.

The presented invention further relates to a device with at least one actuator, one force controller, and one control unit, wherein the control unit is configured for the purpose of providing a user of the device with a haptic feedback message about at least one operating state of the device by means of a force that is predetermined in its strength and acts by way of the at least one actuator on the force controller when the force controller is brought by the user to at least one predetermined point on a track of movement of the force controller, and wherein the control unit is further configured for the purpose of actuating the at least one actuator in such a way that, once the user has deflected the force controller for a predetermined period of time at the at least one predetermined point on the track of movement of the force controller, and/or has held it at this point, the strength of the force acting by way of the at least one actuator on the force controller is to be reduced after another predetermined period of time in order to protect the at least one actuator.

The presented device serves, in particular, for carrying out the presented method.

Further advantages and embodiments of the invention ensue from the description and the appended drawings.

It is understood that the aforementioned features and the features still to be explained below can be used not only in the particularly given combination, but also in other combinations or alone without departing from the scope of the present invention.

BRIEF DESCRIPTION OF THE DRAWING

The invention is illustrated schematically in the drawings on the basis of an embodiment and is described schematically and in detail with reference to the drawings.

DETAILED DESCRIPTION OF THE DRAWING

Figure 1:
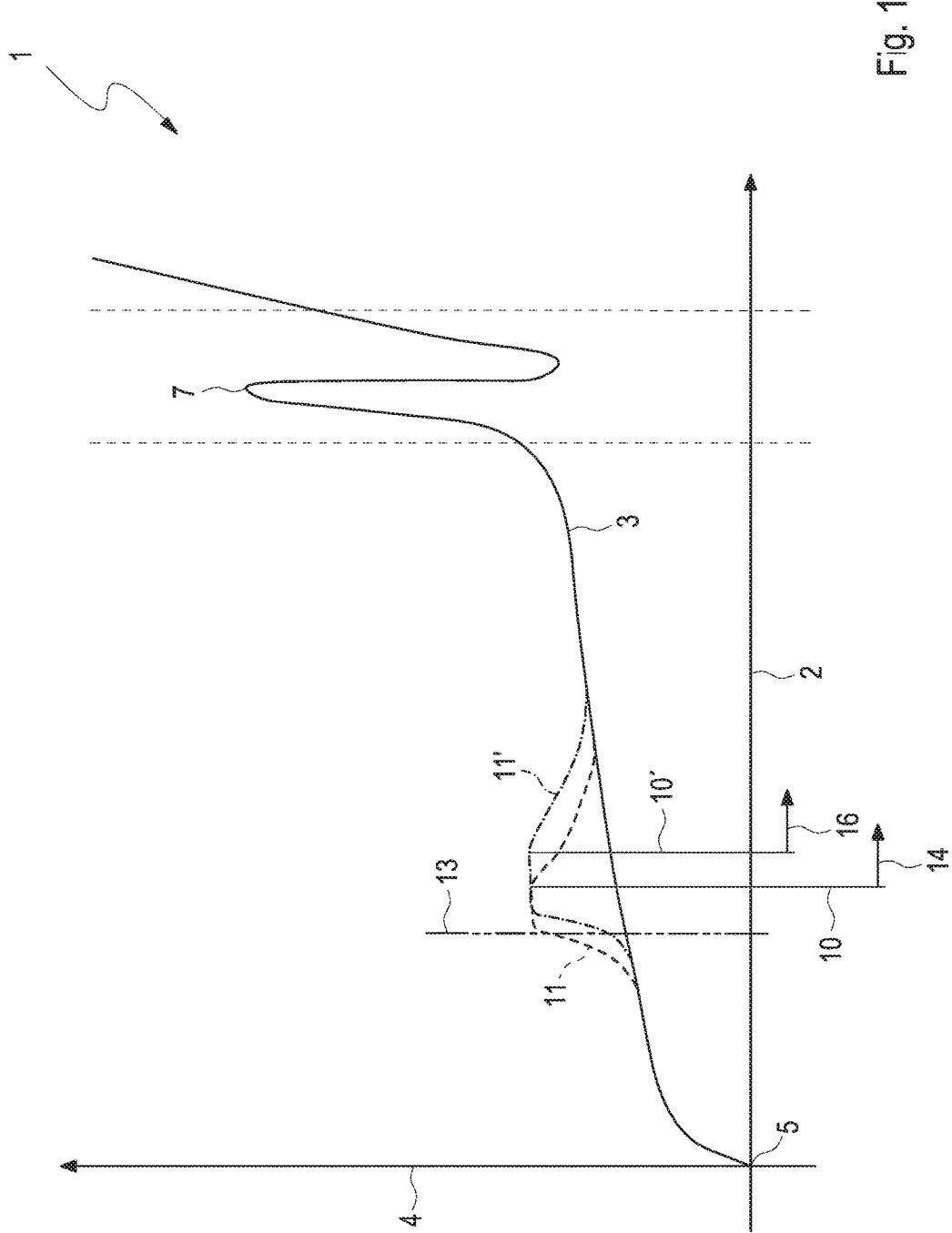
FIG. 1 shows a schematic illustration of one possible embodiment of the presented method.

Illustrated in FIG. 1 is a diagram 1, in which, on the abscissa 2, a path is plotted in [cm] and, on the ordinate 4, a force is plotted in [N]. A curve 3 shows a force that has to be applied by a user in order shift a pedal along its track of movement from a rest position 5 to a kickdown position 7, which engages a final gear stage.

When the pedal shifts along the curve 3, the user detects a haptic feedback message in the form of a pressure point 10 at a predetermined point, at which, for example, an internal combustion engine is switched on to an electric drive, this pressure point being produced by an actuator, which subjects the pedal to a force that counteracts a force applied by the user for moving the pedal, as illustrated by a force curve 11. The pressure point 10 provides the user with a possibility of making a decision as to whether the user wishes to move the pedal beyond the pressure point 10, as indicated by the arrow 14, and to switch on the internal combustion engine or wishes to hold the pedal in front of the pressure point 10 and solely wishes to utilize the electric drive.

If the user wishes to utilize solely the electric drive, the pedal has to be held in front of or on the pressure point 10 in order to prevent switching on of the internal combustion engine. This means that the pedal is held by the user constantly in a region 13 on the curve 3, which can lie in the immediate vicinity of or directly on the pressure point 10. In this case, the actuator is constantly active in the region 13 for providing the force required for the pressure point 10, as indicated by an intersection of the region 13 with the force curve 11, as a result of which, the actuator may overheat after a certain time.

In order to protect the actuator against overheating, it is provided in accordance with the invention that, when the user has held the pedal for a predetermined period of time, such as, for example, a few seconds, in the region 13, the pressure point 10 is shifted along the curve 3 in the direction of the kickdown position 7, as indicated by a shifted pressure point 10'. This means that the pressure point 10 is distanced from the region 13 in which the pedal is held by the user and the actuator needs to use no force or only a small force, as indicated by an intersection of the region 13, with a correspondingly shifted force curve 11' for providing the shifted pressure point 10'. Whereas the region 13 intersects the force curve 11 near an apex of the force curve 11, the region 13 intersects the shifted force curve 11' at a low force level near to its origin. Accordingly, less force is needed by the actuator by way of the force curve 11' in the region 13 than by the force curve 11.

Should the user deflect the pedal, starting from the original pressure point 10, in the direction of the kickdown position 7, the user encounters the shifted pressure point 10' and becomes aware of a haptic feedback message in accordance with the force curve 11'. Because a function for activation of the internal combustion engine is to be provided at all times at a current pressure point and correspondingly has been displaced to the shifted pressure point 10', the user is provided once again with the possibility of deciding between a purely electric drive and an activation of a function for switching on the internal combustion engine at the shifted pressure point 10', as indicated by the arrow 16, which illustrates a switching on the internal combustion engine, so that the user is not restricted in his possible decision by the shifting of the pressure point 10 to the pressure point 10'. Through renewed shifting of the shifted pressure point 10', it is possible once again to protect the actuator, if need be. Accordingly, it is provided that a distance between the pressure point 10 and the shifted pressure point 10' and, if need be, further shifted pressure points is chosen to be as small as possible.

Figure 2:
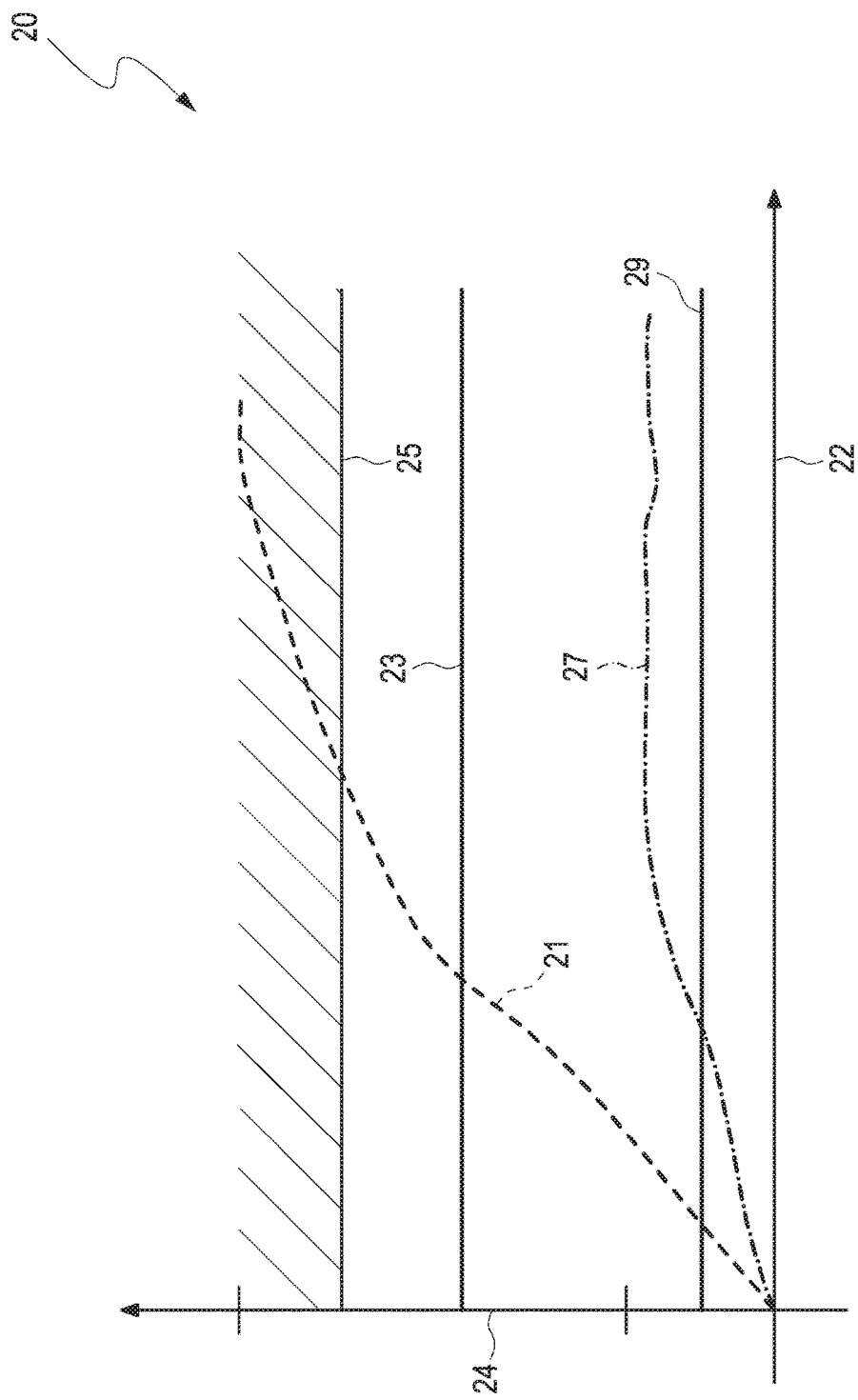
FIG. 2 shows a schematic illustration of different temperature curves during operation of an actuator in accordance with the prior art and during operation of one possible embodiment of the presented method.

Illustrated in FIG. 2 is a diagram 20, which, on the abscissa 22, depicts an elapsed time in [s] and, on the ordinate, both an operating temperature of an actuator in [° C.] and a current intensity in [A] that is applied to the actuator. A temperature curve 21 shows a behavior of the actuator for a constant, that is, sustained provision of a pressure point, as is conventional in the prior art. Once a user holds a pedal in the region of a pressure point, the actuator is supplied constantly with a current in accordance with current curve 23, so that the actuator produces a constant force and constantly provides a feedback message of the pressure point to the user. If the user holds the pedal for a prolonged time on the pressure point, the actuator heats up continuously, as indicated by the temperature curve 21, and, for component protection reasons, is deactivated when a limit temperature 25 is exceeded.

In contrast to this, the temperature curve 27 shows a curve of a heating of an actuator, which is operated in accordance with the presented method. Once the user holds the pedal in the region of the pressure point, the pressure point is shifted, so that the actuator is still supplied with only a small current intensity in accordance with current curve 29. Accordingly, the actuator heats up significantly less in comparison to the temperature curve 21, so that, for component protection reasons, a switching off of the actuator can be prevented.

Obviously, it is also conceivable to power down the current curve 29 after a predetermined period of time in order to deactivate the actuator.

The invention claimed is:

1. A method for the operation of at least one actuator for a force controller of a device, for which a user of the device is provided with a haptic feedback message about at least one operating state of the device by a force, which is predetermined in its strength and acts by way of at least one actuator on the force controller, when the force controller is brought by the user to at least one predetermined point on a track of movement of the force controller, and wherein the at least one actuator is controlled in such a way that, once the user has deflected the force controller for a predetermined period of time at the at least one predetermined point on the track of movement of the force controller and/or has held it at this point, the strength of the force acting by way of the at least one actuator on the force controller is reduced after a further predetermined period of time to prevent overheating of the at least one actuator, and wherein a control unit of the device reduces an electrical current used for the operation of the at least one actuator in order to reduce the strength of the force acting by way of the at least one actuator on the force controller.

2. The method according to claim 1, wherein, for the case that the strength of the force acting by way of the at least one actuator on the force controller is reduced, the predetermined point for the feedback message is shifted onto the track of movement of the force controller in the direction of deflection, so that, for a shift of the force controller to the predetermined point shifted in the direction of deflection, the user is provided once again with a feedback message by the at least one actuator and a force in the predetermined strength.

3. The method according to claim 2, wherein the period of time during which the user has to bring the force controller to the at least one predetermined point of the track of movement of the force controller and/or during the further period of time after which the strength of the force acting on the force controller is reduced and/or a distance by which the predetermined point on the track of movement of the force controller is shifted in the direction of deflection are or is chosen dynamically as a function of an operating parameter.

4. The method according to claim 1, wherein the strength of the force acting by way of the at least one actuator on the force controller is reduced in accordance with a predetermined curve gradient.

5. The method according to claim 4, wherein the curve gradient is chosen as a function of the force by the user acting on the force controller.

6. The method according to claim 1, wherein the strength of the force acting by way of the at least one actuator on the force controller is reduced after another predetermined period of time when the force controller has been held by the user at a point on the track of movement of the force controller, said point lying in front of the point at which the user is provided with the haptic feedback message at the force controller.

7. The method according to claim 1, wherein the reduction in the strength of the force acting by way of the at least one actuator on the force controller occurs as a function of a movement profile of the force controller.

8. The method according to claim 1, wherein the reduction in the strength of the force acting by way of the at least one actuator on the force controller occurs as a function of at least one external condition taken from the following list: ambient temperature of the at least one actuator, air humidity in the surroundings of the at least one actuator, and state of charge of an energy storage unit supplying the at least one actuator with electric power.

9. A device with at least one actuator, one force controller, and one control unit, wherein the control unit is configured for the purpose of providing a user of the device with a haptic feedback message about at least one operating state of the device by a force, which is predetermined in its strength and acts by way of the at least one actuator on the force controller, when the force controller is brought by the user to at least one predetermined point on a track of movement of the force controller, and wherein the control unit is further configured for the purpose of actuating the at least one actuator in such a way that, once the user has deflected the force controller for a predetermined period of time at the at least one predetermined point on the track of movement of the force controller and/or has held it at this point, the strength of the force acting by way of the at least one actuator on the force controller is reduced after another predetermined period of time to prevent overheating of the at least one actuator, and wherein the control unit reduces an electrical current used for the operation of the at least one actuator in order to reduce the strength of the force acting by way of the at least one actuator on the force controller.

\* \* \* \* \*